(12) United States Patent
Hashimoto et al.

(10) Patent No.: US 8,457,558 B2
(45) Date of Patent: *Jun. 4, 2013

(54) INFORMATION PROCESSING APPARATUS AND CAPTURE IMAGE TRANSMITTING METHOD

(75) Inventors: Ayumi Hashimoto, Akishima (JP);
Hideki Ohkita, Kunitachi (JP);
Hideyuki Nakagawa, Koganei (JP);
Satoshi Odakura, Kodaira (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 78 days.

This patent is subject to a terminal disclaimer.

(21) Appl. No.: 13/115,908

(22) Filed: May 25, 2011

(65) Prior Publication Data
US 2011/0228108 A1 Sep. 22, 2011

Related U.S. Application Data

(63) Continuation of application No. 12/827,644, filed on Jun. 30, 2010, now Pat. No. 8,233,843.

(30) Foreign Application Priority Data

Jun. 30, 2009 (JP) .................................. 2009-156275

(51) Int. Cl.
*H04B 7/00* (2006.01)

(52) U.S. Cl.
USPC ....... 455/41.2; 455/566; 455/556.1; 455/557; 455/41.3; 348/10.1; 348/207.1; 340/539.1; 235/486; 235/492; 726/8

(58) Field of Classification Search
USPC ................... 455/41.2, 41.1, 41.3, 566, 556.1, 455/556.2, 557; 348/207.1; 340/10.1, 539.1; 235/486, 492; 726/8
See application file for complete search history.

(56) References Cited

U.S. PATENT DOCUMENTS

| 4,945,533 A | 7/1990 | Schroeder et al. |
| 7,323,991 B1 * | 1/2008 | Eckert et al. ............... 340/572.1 |

(Continued)

FOREIGN PATENT DOCUMENTS

| JP | 2005-045557 A | 2/2005 |
| JP | 2005-204212 A | 7/2005 |

(Continued)

OTHER PUBLICATIONS

Notice of Reason for Rejection mailed by Japan Patent Office on Oct. 26, 2010 in the corresponding Japanese patent application No. 2009-156275.

(Continued)

*Primary Examiner* — Marceau Milord
(74) *Attorney, Agent, or Firm* — Knobbe, Martens, Olson and Bear, LLP

(57) ABSTRACT

A method of transmitting a capture image for an information processing apparatus comprising a communication module configured to execute close proximity wireless transfer. The method may include establishing connection between the communication module and an external device. The method may also include generating image data for a screen displayed on a display device and transmitting the generated image data to the external device when a "Get default object" command defined in a push protocol class of an object exchange (OBEX) protocol for requesting acquisition of a default object is received from the external device in a state where connection between the communication module and the external device is established, the "Get default object" command comprising a parameter for indicating an attribute of requested data as images.

4 Claims, 12 Drawing Sheets

U.S. PATENT DOCUMENTS

| | | | |
|---|---|---|---|
| 7,499,549 B2 | 3/2009 | Lima et al. | |
| 7,539,631 B1 | 5/2009 | El-Haj | |
| 7,590,384 B2 | 9/2009 | Dawidowsky | |
| 7,724,705 B2 | 5/2010 | Erola et al. | |
| 7,783,255 B2 | 8/2010 | Tezuka | |
| 7,825,772 B2 | 11/2010 | Moritani | |
| 7,970,352 B2 * | 6/2011 | Tomoda | 455/41.2 |
| 8,005,950 B1 | 8/2011 | Ashcraft et al. | |
| 8,064,831 B2 * | 11/2011 | Ohkita | 455/41.2 |
| 8,117,318 B2 * | 2/2012 | Odakura | 709/227 |
| 8,135,347 B2 * | 3/2012 | Ohkita | 455/41.2 |
| 8,140,015 B2 * | 3/2012 | Ohkita | 455/41.2 |
| 8,165,523 B2 * | 4/2012 | Makela et al. | 455/41.2 |
| 8,208,960 B2 * | 6/2012 | Rajan et al. | 455/557 |
| 8,233,843 B2 * | 7/2012 | Hashimoto et al. | 455/41.2 |
| 2006/0044153 A1 | 3/2006 | Dawidowsky | |
| 2007/0211579 A1 | 9/2007 | Yoshimura et al. | |
| 2007/0265033 A1 * | 11/2007 | Brostrom | 455/557 |
| 2010/0273526 A1 | 10/2010 | Rajan et al. | |

FOREIGN PATENT DOCUMENTS

| | | |
|---|---|---|
| JP | 2007-020094 A | 1/2007 |
| JP | 2007-288380 A | 11/2007 |
| JP | 2008-109580 A | 5/2008 |
| JP | 2008-270927 A | 11/2008 |

OTHER PUBLICATIONS

Office Action dated Nov. 25, 2011 in parent U.S. Appl. No. 12/827,644.

* cited by examiner

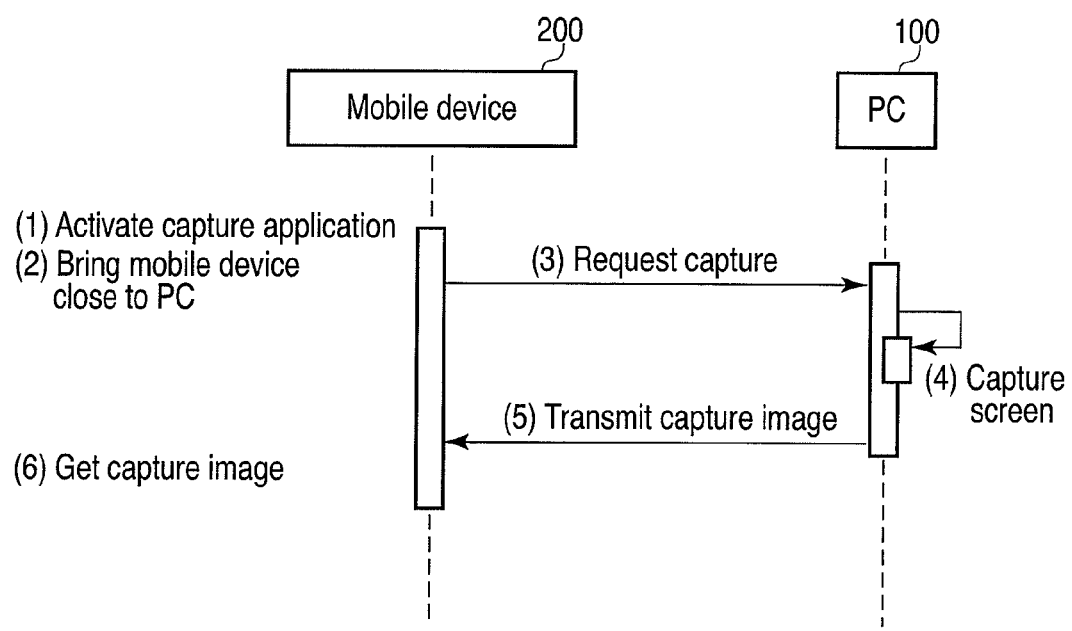
F I G. 3

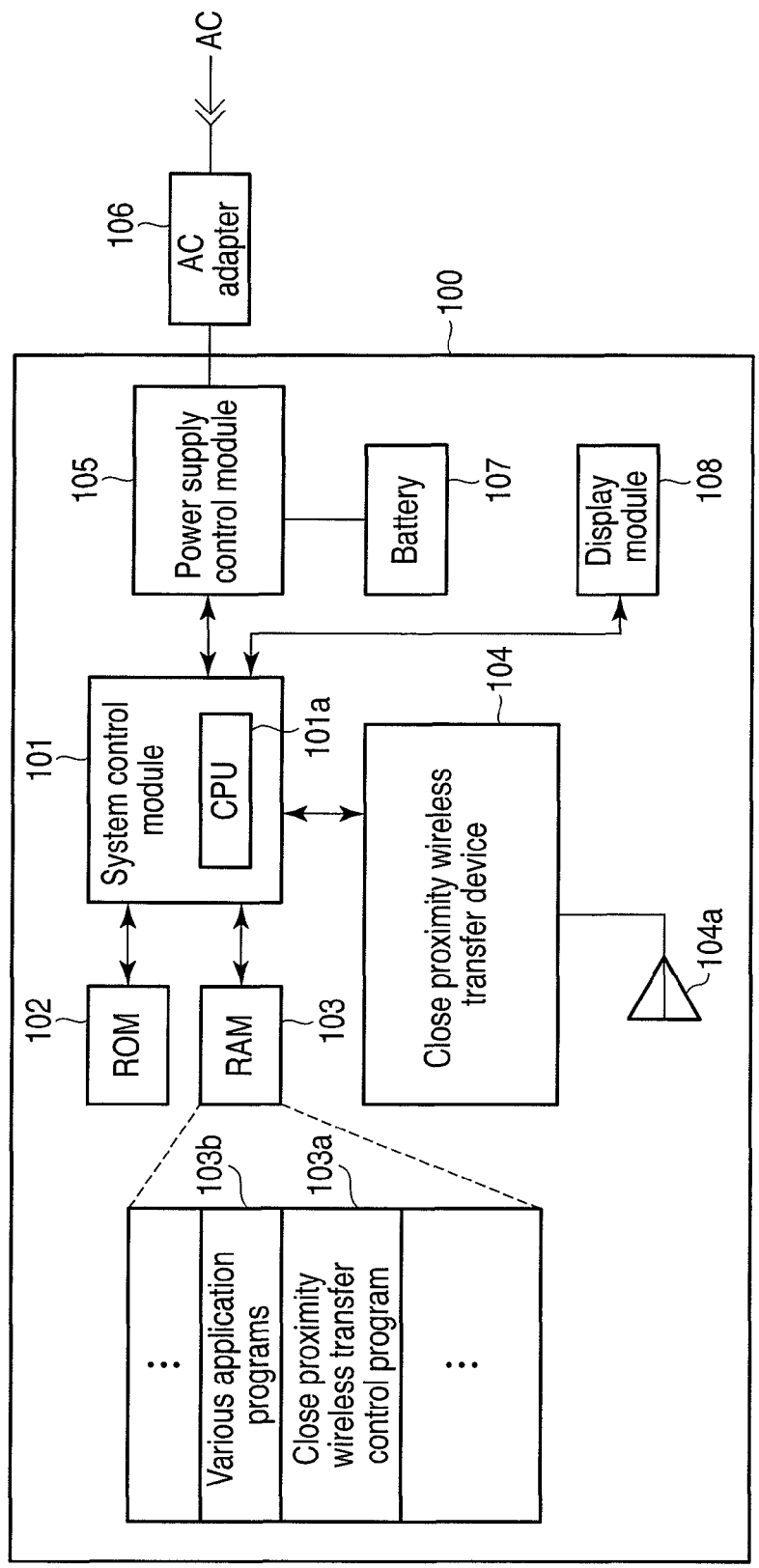
F I G. 4

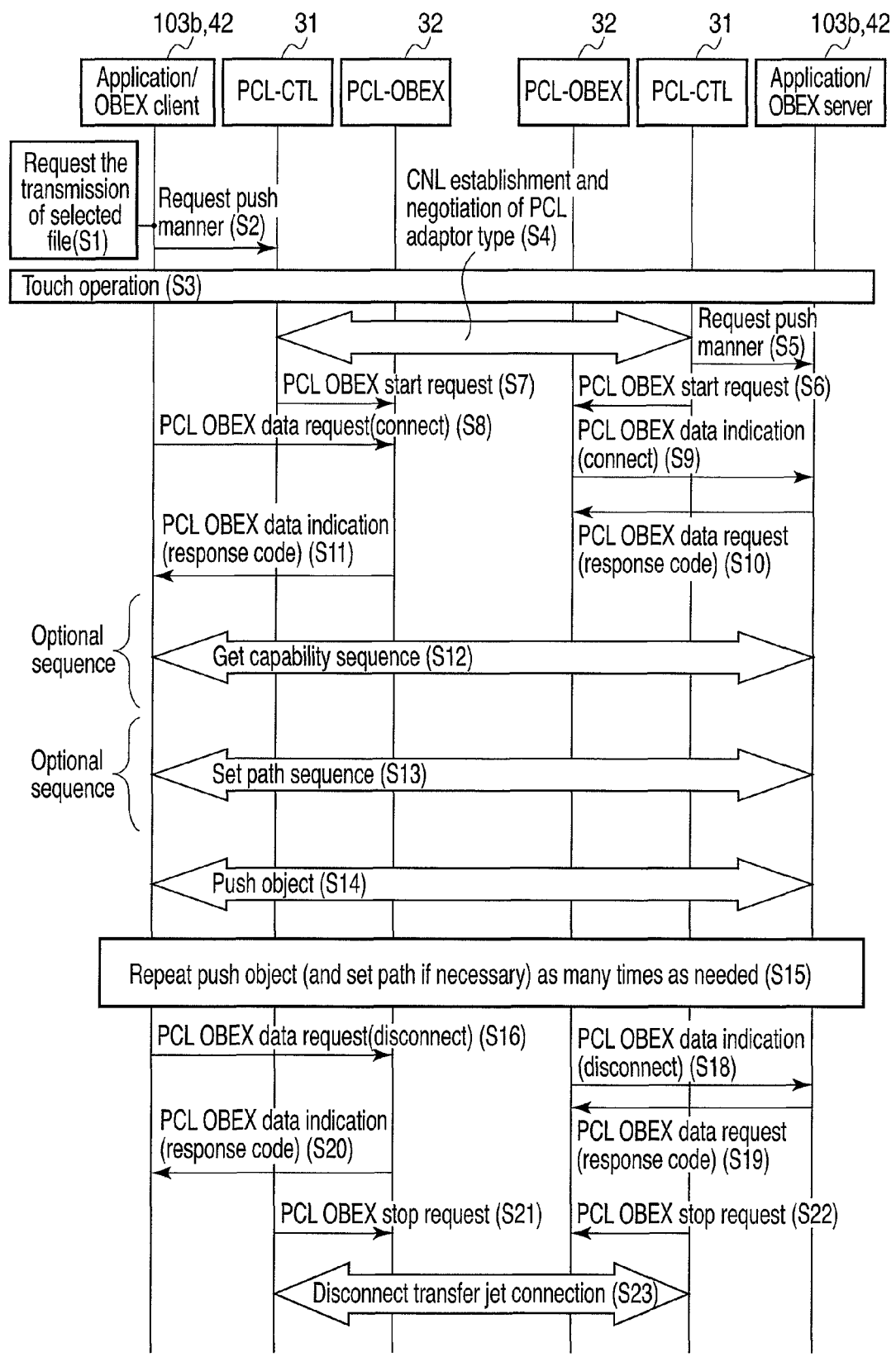
F I G. 6

Operation used in Push Protocol Class

| Operation | Client | Server |
|---|---|---|
| Connect | Mandatory | Mandatory |
| Disconnect | Mandatory | Mandatory |
| Put | Mandatory | Mandatory |
| Get | Optional | Mandatory |
| Abort | Mandatory | Mandatory |
| Setpath | Optional | Mandatory |
| Action | Not supported | Not aupported |
| Session | Not supported | Not aupported |
| User definable | Not supported | Not aupported |

FIG. 7

Header IDs used in push protocol class

| Operation | Client | Server |
|---|---|---|
| Count | Optional | Optional |
| Name | Mandatory | Mandatory |
| Type | Mandatory | Mandatory |
| Length | Mandatory | Mandatory |
| Time | Optional | Optional |
| Description | Optional | Optional |
| Target | Not supported | Not supported |
| Http | Optional | Optional |
| Body | Mandatory | Mandatory |
| Endofbody | Mandatory | Mandatory |
| Auth challenge | Not supported | Not supported |
| SRM | Mandatory | Mandatory |
| SRM parameter | Mandatory | Mandatory |
| Connection ID | Not supported | Not supported |
| Application param | Not supported | Not supported |
| User defined | Not supported | Not supported |

FIG. 8

| Client | Description |
|---|---|
| Connect | Connect without target header |
| Get capabilities | Get server capabilities (client: optional, server: mandatory) |
| Set path | Hereinafter, used for grouping objects to be sent.<br>Not forced to create a folder.<br>Server always returns success in response to setpath operation. |
| Push object | Transmit object by put operation |
| Get default object | Get default object (optional)<br>Server determines a suitable object from the specified type header and transfers the object<br>  Ex.)<br>    "text/x-vcard" default name card<br>    "image/jpeg" image serviced by the server side<br>      (e.g., server-side screen capture) |
| Disconnect | |

FIG. 9

Connect

| Direction | Operation code/header | | Final bit | Header data | Description |
|---|---|---|---|---|---|
| Request | Connect | | v | | |
| | | SRM mode | | 0x01 | Request to enable SRM mode |
| Response | Success | | v | | |
| | | SRM mode | | 0x01 | Confirmation to enable SRM mode |

FIG. 10

Get capabilities

| Direction | Operation code/header | | Final bit | Header data | Description |
|---|---|---|---|---|---|
| Request | GET | | v | | |
| | | Type | | " x-obex/capability" | |
| Response | Continue | | v | | |
| | | Body | | Capability object parts | |
| Response | Success | | v | | |
| | | End of body | | Capability object parts | |

F I G. 11

Set path

| Direction | Operation code/header | | Final bit | Header data | Description |
|---|---|---|---|---|---|
| Request | Set path | | v | | |
| | | Name | | "Folder name" | For identifying objects |
| Response | Success | | v | | Constantly success |
| | | No header | | | |

F I G. 12

Push object

| Direction | Operation code/header | | Final bit | Header data | Description |
|---|---|---|---|---|---|
| Request | Put | | | | |
| | | Type | | Mime type | Depends on an object to be transmitted |
| | | Length | | Object size | |
| | | Body | | | |
| Request | Put | | | | |
| | | Body | | | |
| Request | Put | | v | | |
| | | End of body | | | |
| Response | Success | | v | | |
| | | No header | | | |

F I G. 13

Get default object

| Direction | Operation code/header | | Final bit | Header data | Description |
|---|---|---|---|---|---|
| Request | Get | | v | | |
| | | Name | | Empty name | |
| | | Type | | Mime type | |
| Response | Continue | | v | | |
| | | Length | | Object size | |
| | | Body | | Default object parts | |
| Response | Success | | v | | |
| | | End of body | | Default object parts | |

F I G. 14

Disconnect

| Direction | Operation code/header | | Final bit | Header data | Description |
|---|---|---|---|---|---|
| Request | Disconnect | | v | | |
| | | No header (or optional headers) | | | |
| Response | Success | | v | | |
| | | No header (or optional headers) | | | |

F I G. 15

INFORMATION PROCESSING APPARATUS AND CAPTURE IMAGE TRANSMITTING METHOD

CROSS-REFERENCE TO RELATED APPLICATIONS

This is a continuation of U.S. patent application Ser. No. 12/827,644 filed on Jun. 30, 2010, which is based upon and claims the benefit of priority from Japanese Patent Application No. 2009-156275, filed Jun. 30, 2009, the entire contents of both of which are incorporated herein by reference.

FIELD

Embodiments described herein relate generally to a capture-image-transmitting technique suitable for an information processing apparatus which communicates by a close proximity wireless transfer method.

BACKGROUND

In recent years, such wireless communication as near field communication (NFC) has been popularized. With the popularization of such wireless communication, users can communicate easily for authentication, accounting, or the like simply by holding an integrated circuit (IC) card or a mobile phone over the reader/writer part of a host unit.

In addition, these days, close proximity wireless transfer techniques capable of faster communication are being developed. The new close proximity wireless transfer techniques enable not only authentication and accounting services but also data files, such as document data files, image data files, or audio data files, to be exchanged between devices simply by bringing the devices close to each other.

For example, Jpn. Pat. Appln. KOKAI Publication No. 2007-20094 has disclosed a mechanism enables two devices to easily transmit only the desired one of a plurality of items of image data stored in one device to the other device by close proximity wireless transfer.

With the recent widespread use of the Internet, various pieces of information can be acquired by browsing various Web pages released on the Internet with a browser (browsing software). Therefore, between two devices, if not only image data held in one device in the form of a data file but also its display screen can easily be transmitted as image data to the other device, the user can simply bring his or her mobile phone close to a personal computer (PC) that is displaying a Web page with, for example, a map to a destination to load image data on the map into the mobile phone, which boosts convenience.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 3 is an exemplary view showing a general sequence of a capture image transmission between a PC and a mobile phone in the close proximity wireless transfer system of the embodiment;

FIG. 4 is an exemplary view showing a configuration of the PC, one element of the close proximity wireless transfer system of the embodiment;

FIG. 6 is an exemplary view showing a file transmission sequence performed between a client and a server using an OBEX protocol in the close proximity wireless transfer system of the embodiment;

FIG. 7 is an exemplary view showing a table to explain operations used in a push protocol class defined in the OBEX protocol used in the close proximity wireless transfer system of the embodiment;

FIG. 8 is an exemplary view showing a table to explain Header IDs used in the push protocol class defined in the OBEX protocol used in the close proximity wireless transfer system of the embodiment;

FIG. 9 is an exemplary view showing a table to explain the procedure for offering services in the push protocol class defined in the OBEX protocol used in the close proximity wireless transfer system of the embodiment;

FIG. 10 is an exemplary view showing a table to explain a "Connect" procedure in the push protocol class defined in the OBEX protocol used in the close proximity wireless transfer system of the embodiment;

FIG. 11 is an exemplary view showing a table to explain a "Get capabilities" procedure in the push protocol class defined in the OBEX protocol used in the close proximity wireless transfer system of the embodiment;

FIG. 12 is an exemplary view showing a table to explain a "Set path" procedure in the push protocol class defined in the OBEX protocol used in the close proximity wireless transfer system of the embodiment;

FIG. 13 is an exemplary view showing a table to explain a "Push object" procedure in the push protocol class defined in the OBEX protocol used in the close proximity wireless transfer system of the embodiment;

FIG. 14 is an exemplary view showing a table to explain a "Get default object" procedure in the push protocol class defined in the OBEX protocol used in the close proximity wireless transfer system of the embodiment;

FIG. 15 is an exemplary view showing a table to explain a "Disconnect" procedure in the push protocol class defined in the OBEX protocol used in the close proximity wireless transfer system of the embodiment;

DETAILED DESCRIPTION

Various embodiments will be described hereinafter with reference to the accompanying drawings.

In general, according to one embodiment, a method for transmitting a capture image for an information processing apparatus comprising a communication module configured to execute close proximity wireless transfer comprises establishing connection between the communication module and an external device; and generating image data for a screen displayed on a display device and transmitting the generated image data to the external device when a "Get default object" command defined in a push protocol class of an object exchange (OBEX) protocol for requesting acquisition of a default object is received from the external device in a state where connection between the communication module and the external device is established, the "Get default object" command comprising a parameter for indicating an attribute of requested data as images.

Figure 1:
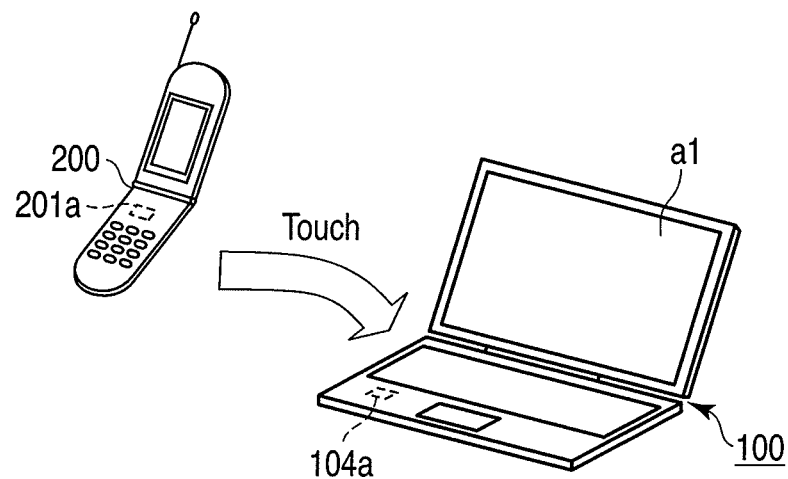
FIG. 1 is an exemplary first view showing a system configuration of a close proximity wireless transfer system according to an embodiment and a general outline of close proximity wireless transfer performed between two devices in the close proximity wireless transfer system.
Figure 2:
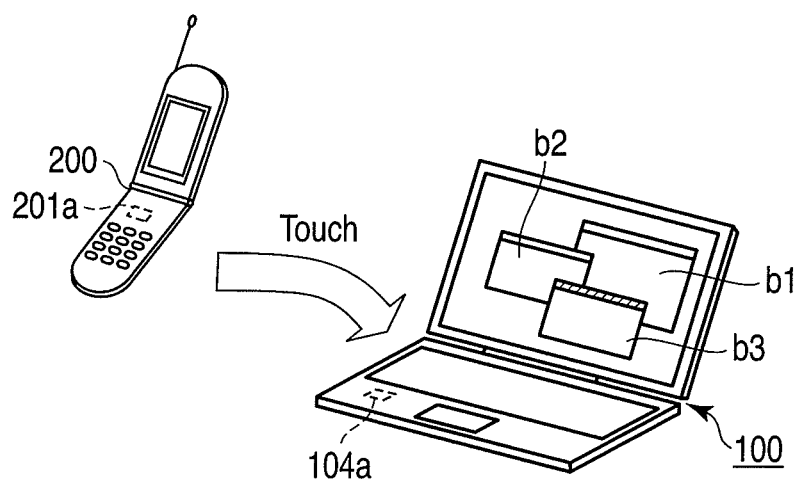
FIG. 2 is an exemplary second view showing the system configuration of the close proximity wireless transfer system of the embodiment and the general outline of close proximity wireless transfer performed between the two devices in the close proximity wireless transfer system.

FIG. 1 and FIG. 2 show a system configuration of a close proximity wireless transfer system according to an embodiment and a general outline of close proximity wireless transfer performed between two devices in the close proximity wireless transfer system.

As shown in FIG. 1 and FIG. 2, the close proximity wireless transfer system of the embodiment includes a notebook PC 100 and a mobile phone (or a mobile device) 200. The PC 100 and mobile phone 200 are provided with antennas (or couplers) 104a, 201a, respectively for close proximity wireless transfer. Simply holding the mobile phone 200 over the PC 100 in a touch operation so that the couplers 104a, 201a may contact each other enables data transmission between the PC 100 and mobile phone 200.

To take better advantage of being capable of performing data transmission simply by the touch operation in an intuitive operation, the close proximity wireless transfer system of the embodiment enables the mobile phone 200 to be held over the PC 100 to load image data (or capture images) of the screen now being displayed on the PC 100 into the mobile phone 200. FIG. 1 shows a case of loading image data of an entire display screen "a1" of the PC 100 into the mobile phone 200. FIG. 2 shows a case of loading image data of an active window "b3" of a plurality of windows "b1", "b2" and "b3" opened on the display screen into the mobile phone 200.

FIG. 3 shows a general sequence of a capture image transmission between the PC 100 and mobile phone 200 in the close proximity wireless transfer system of the embodiment.

For example, the user who wants to load image data of the display screen on the PC 100 that is displaying a Web page into the mobile phone 200 activates a capture application program for requesting the PC 100 to transmit capture images (a capture request) on the mobile phone 200 ((1) in FIG. 3) and brings the mobile phone 200 with the running capture application close to the PC 100 ((2) in FIG. 3). The act of activating the capture application program and the act of bringing the mobile phone 200 close to the PC 100 may be reversed in order.

When the PC 100 and mobile phone 200 (provided with the couplers 104a, 201a respectively) are brought close to each other, the PC 100 and mobile phone 200 are connected to each other by wireless and a capture request is transmitted from the mobile phone 200 running the capture application program to the PC 100 ((3) in FIG. 3).

Having received the capture request, the PC 100 captures the screen being displayed, creates its image data (capture image) ((4) in FIG. 3), and transmits the created capture image to the mobile phone 200 ((5) in FIG. 3). Then, the capture application program activated on the mobile phone 200 receives the capture image transmitted in response to the capture request and stores it into a storage unit ((6) in FIG. 3).

As described above, the close proximity wireless transfer system of the embodiment enables the image data (or capture image) of the screen now being displayed on the PC 100 to be loaded into the mobile phone 200 by a simple operation on the mobile phone 200 (specifically, by activating the capture application program and bringing the mobile phone 200 into contact with the PC 100).

FIG. 4 shows a configuration of the PC 100 which carries out a process of transmitting capture images to the mobile phone 200.

As shown in FIG. 4, the PC 100 includes a system control module 101, a read-only memory (ROM) 102, a random access memory (RAM) 103, a close proximity wireless transfer device 104, a power supply control module 105, an alternating current (AC) adapter 106, a battery 107, and a display module 108.

The system control module 101 controls the operations of the various components of the PC 100. The system control module 101, which includes a central processing unit (CPU) 101a, is connected to the ROM 102, RAM 103, close proximity wireless transfer device 104, power supply control module 105, and display module 108.

The CPU 101a is a processor which loads an instruction group and data stored in the ROM 102 into the RAM 103 and executes the necessary processes. A close proximity wireless transfer control program 103a for controlling close proximity wireless transfer and various application programs 103b are loaded into the RAM 103. The CPU 101a executes the close proximity wireless transfer control program 103a loaded into the RAM 103, thereby controlling the close proximity wireless transfer device 104.

The close proximity wireless transfer device 104 is a communication module which performs close proximity wireless transfer. The close proximity wireless transfer device 104 establishes wireless communication with another device (or an external device), such as a mobile phone 200 with a close proximity wireless transfer function, within a specific distance from the close proximity wireless transfer device 104, thereby performing communication, such as data file transmission or reception.

Close proximity wireless transfer between the close proximity wireless transfer device 104 and an external device is performed in a peer-to-peer style. The communication enable distance is, for example, 3 cm. That is, only when the distance between the close proximity wireless transfer device 104 and the external device approaches, for example, 3 cm or less, wireless connection between the close proximity wireless transfer device 104 and external device becomes possible. When the distance between the close proximity wireless transfer device 104 and external device comes is within the communication enable distance, wireless connection between the close proximity wireless transfer device 104 and external device is established. Then, data, such as the data files specified by the user or predetermined synchronized data files, are exchanged between the close proximity wireless transfer device 104 and external device. The close proximity wireless transfer system of the embodiment transmits capture images in response to a capture request from the external device.

In close proximity wireless transfer, induction fields are used. One close proximity wireless transfer method is, for example, TransferJet. TransferJet, which is a close proximity wireless transfer method using an ultra wideband (UWB), can realize high-speed data transmission.

The close proximity wireless transfer device 104 is connected to the antenna 104a. The antenna 104a, which is an electrode called a coupler, transmits and receives data to and from an external device by a wireless signal using induction fields. When the external device is within the communication enable distance (e.g., 3 cm) from the antenna 104*a*, the antenna (coupler) of the close proximity wireless transfer device 104 and that of the external device are coupled with each other by induction fields, which enables wireless communication between the close proximity wireless transfer device 104 and external device. The close proximity wireless transfer device 104 and antenna 104*a* can be integrated into a single module.

The power supply control module 105 supplies electric power to various components of the PC 100 by using electric power externally supplied via the AC adapter 106 or electric power supplied from the battery 107. In other words, the PC 100 is driven by an external power supply, such as an AC commercial power supply, or the battery 107. The AC adapter 106 may be provided in the PC 100.

The display module 108, which is, for example, a liquid-crystal display (LCD), displays image data drawn by the CPU 101*a* of the system control module 101.

The mobile phone 200 has almost the same configuration as that of the PC 100 shown in FIG. 4 and also realizes close proximity wireless transfer by causing the CPU to execute the close proximity wireless transfer control program. Therefore, a detailed explanation of the mobile phone 200 will be omitted. The aforementioned capture application program for requesting the PC 100 to transmit capture images (capture request) run on the mobile phone 200 exists as one of the various application programs.

Next, software architecture for controlling close proximity wireless transfer in the embodiment will be explained with reference to FIG. 5.

Figure 5:
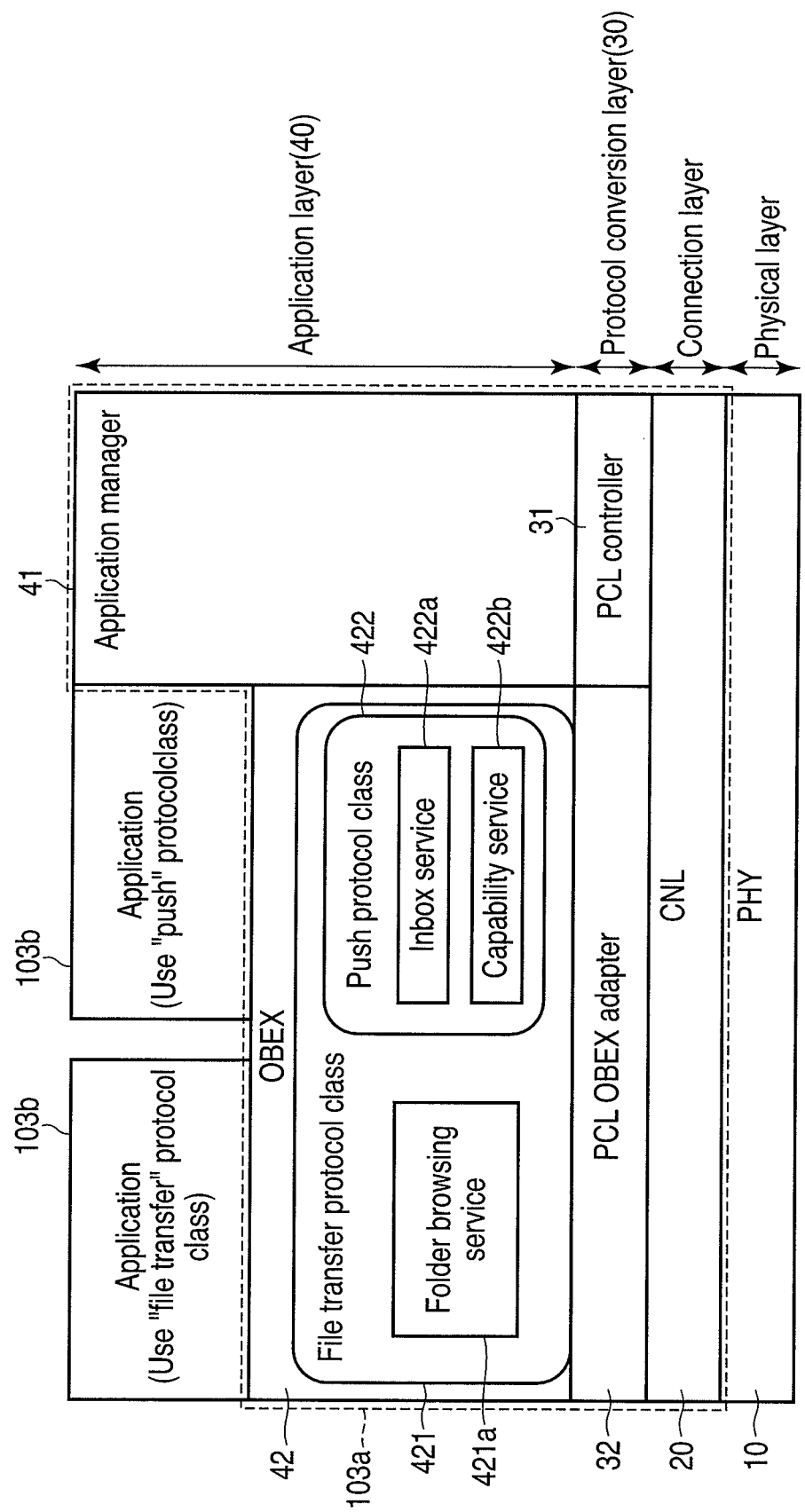
FIG. 5 is an exemplary view to explain a software architecture for controlling close proximity wireless transfer applied to the close proximity wireless transfer of the embodiment.

The software architecture of FIG. 5 shows the hierarchical structure of a protocol stack for controlling close proximity wireless transfer. The protocol stack is composed of a physical layer (PHY) 10, a connection layer (CNL) 20, a protocol conversion layer 30, and an application layer 40. The protocol conversion layer 30 includes a protocol conversion layer (PCL) controller 31 and a PCL object exchange (OBEX) adapter 32. The application layer 40 includes an application manager 41 and an OBEX protocol 42. The connection layer (CNL) 20, protocol conversion layer 30, and application layer 40 may be realized by the close proximity wireless transfer control program 103*a*.

The physical layer (PHY) 10, which controls physical data transmission, corresponds to a physical layer in an OSI reference model. A part or all of the function of the physical layer (PHY) 10 may be realized by using the hardware of the close proximity wireless transfer device 104. The physical layer (PHY) 10 converts data from the connection layer (CNL) 20 into a wireless signal.

The connection layer (CNL) 20, which corresponds to a data link layer and a transport layer in the OSI reference model, performs data communication by controlling the physical layer (PHY) 10. In response to a connection request from the protocol conversion layer 30 (PCL controller 31) or a connection request from an external device, the connection layer (CNL) 20 carries out the process of establishing connection (CNL connection) between the close proximity wireless transfer device 104 and the external device set in a proximity state.

The protocol conversion layer 30, which corresponds to a session layer and a presentation layer in the OSI reference model, is located between the application layer 40 and the connection layer (CNL) 20. The PCL controller 31 controls the establishment and cancellation of the CNL connection by the connection layer (CNL) 20. The PCL OBEX adapter 32 performs a conversion process for converting data (user data) corresponding to application protocols (e.g., OBEX protocol 42, SCSI, and other general-purpose protocols) handled by the various application programs 103*b* operating as communication programs, into a specific transfer data format. Even if data has been transmitted and received by a communication program that deals with any application protocol, the conversion process converts the data into packets (data in a specific transfer data format) which can handled by the connection layer (CNL) 20. That is, the PCL OBEX adapter 32 of the protocol conversion layer 30 enables various application protocols to be used in close proximity wireless transfer.

The PCL controller 31 of the protocol conversion layer 30 performs the process of exchanging service information (information indicating services each device can offer) and session information (information relating sessions to be established/disconnected) with an external device at the communication partner, the activation of an application, the management of connection, the management of sessions, etc. When a capture request has been received, a capture application program for performing a capture image transmission process is activated automatically under the control of the PCL controller 31. The capture application program in the PC 100 exists as one of the various application programs 103*b*.

The application layer 40, which controls data transmission between programs, corresponds to an application layer in the OSI reference model. Here, a case where data is transmitted and received in the OBEX protocol 42 will be explained.

The OBEX protocol 42 establishes CNL connection by using the PCL controller 31 controlled by the application manger 41 and communicates via the PCL OBEX adapter 31. In the OBEX protocol 42, application rules (protocol classes), which enable OBEX applications to transmit and receive to and from each other, have been defined. The various application programs 103*b* may transmit and receive objects, such as data files, by using the OBEX protocol procedure in the protocol class. In the OBEX protocol 42 of the embodiment, a file transfer protocol class 421 and a push protocol class 422 have been defined as a basic protocol class. As shown in FIG. 5, the file transfer protocol class 421 includes the push protocol class 422.

The push protocol class 422 is used to transmit one or more files from a client to a server. In the push protocol class 422, the procedure for a client (in this case, the mobile phone 200) pushing an arbitrary file and handing it over to a server (in this case, the PC 100) has been defined. In the push protocol class 422, the procedure necessary before transmitting files by close proximity wireless transfer (TransferJet) is simplified, thereby alleviating the burden of user operation and enabling high-speed data communication. Suppose an INBOX service 422*a* in the push protocol class 422 performs the procedure based on the INBOX service written in the known specification of "IrDA object exchange protocol version 1.4". A detailed explanation of the procedure will be omitted. Capability service 422*b* is used to acquire data indicating the capability of the server.

The file transfer protocol class 421 is used to enable a client and a server to transmit and receive one or more files to and from each other. In the file transfer protocol class 421, the procedure for supporting file transmission corresponding to File Transfer Protocol (FTP) and file folder operation has been defined.

In the file transfer protocol class 421, unlike file transmission using the push protocol class 422, data (folder information) indicating a folder and a file at the file destination (server) is acquired from the server by a folder browsing service 421*a* before a file is transmitted. Then, based on the folder information, a folder is moved (created) to the file destination, which enables the file to be transmitted. Suppose the file transfer protocol class 421 performs the procedure based on the "Folder browsing service" written in the known specification of "IrDA object exchange protocol version 1.4". A detailed explanation of the procedure will be omitted.

As described above, the file transfer protocol class 421 includes the push protocol class 422. Therefore, even when a file is transmitted using the file transfer protocol class 421, the INBOX service 422*a* and capability service 422*b* may be used.

The various application programs 103*b* carry out the process of requesting the PCL controller 31 in the protocol conversion layer 30 to start/terminate a session and the process of transmitting and receiving data via the PCL OBEX adapter 32 in the protocol conversion layer 30 by using the OBEX protocol 42. That is, the various application programs 103*b* transmit/receive one or more files to and from the server using the file transfer protocol class 421 of the OBEX protocol 42 or transmit one or more files to the server using the push protocol class 422 of the OBEX protocol 42. The process of transmitting capture images in the close proximity wireless transfer system of the embodiment is realized by using the procedure defined in the push protocol class 422 of the OBEX protocol 42.

FIG. 6 shows a file transmission sequence executed between the client and server using the OBEX protocol 42. In FIG. 6, the left side corresponds to the client and the right side corresponds to the server.

When file selection and transmission request, which are to be transmitted to the server-side application program 103*b*/OBEX protocol 42, are performed according to user operation ((S1) in FIG. 6), the client-side application program 103*b*/OBEX protocol 42 requests the PCL controller 31 to transmit a file in the push protocol class 422 ((S2) in FIG. 6). Then, the client stays in a connection standby state until close proximity wireless transfer with the server becomes possible. Suppose the server is also in the connection standby state using close proximity wireless transfer.

Here, suppose the user has brought the client-side device close to the sever-side device and touched the former to the latter ((S3) in FIG. 6). When close proximity wireless transfer has become possible, physical connection is established between the client-side PCL controller 31 and the server-side PCL controller 31 and the type of PCL OBEX adapter 32 (communication adapter) corresponding to the protocol of the application program 103*b* is adjusted ((S4) in FIG. 6).

That is, the client-side PCL controller 31 establishes physical connection with the server in the proximity state by use of the connection layer (CLN) 20. The server-side PCL controller 31 also establishes physical connection with the client.

The client-side PCL controller 31 performs a so-called negotiation process in order to transmit to the server-side PCL controller 31 session information relating a session to be established, such as session information including information indicating a communication adapter to be used, information indicating an attribute of data transmitted by the application program 103*b*, and information that identifies the application program 103*b*. On the basis of the session information from the client-side PCL controller 31, the server-side PCL controller 31 activates a communication adapter (in this case, PCL OBEX adapter 32) corresponding to the protocol of application program 103*b* which has transmitted a new session start request in order to establish a session used for the application program 103*b* to communicate with the client-side application program 103*b* via the close proximity wireless transfer device 104.

When a session has been established, the server-side PCL controller 31 requests the application program 103*b*/OBEX protocol 42 to transmit or receive a file using the push protocol class 422 ((S5) in FIG. 6). In addition, the PCL controller 31 requests the PCL OBEX adapter 32 to start to communicate using the OBEX protocol 42 ((S6) in FIG. 6). Similarly, on the client side, too, when the session has been established, the PCL controller 31 requests the PCL OBEX adapter 32 to start to communicate in the OBEX protocol 42 ((S7) in FIG. 6).

FIG. 7 shows operations used in the push protocol class 422 defined in the OBEX protocol 42 at each of the client and server which perform data communication by close proximity wireless transfer. FIG. 8 shows "Header ID"s.

FIG. 9 shows procedures (or commands) for offering services in the push protocol class 422. FIG. 10, FIG. 11, FIG. 12, FIG. 13, FIG. 14 and FIG. 15 show a sequence in each of the procedures shown in FIG. 9. Hereinafter, explanation will be given taking as an example file transmission according to the procedure defined in the push protocol class 422 used in the process of transmitting capture images on the close proximity wireless transfer system of the embodiment.

The application program 103*b*/OBEX protocol 42 on each of the client side and server side performs a "Connect" procedure by the CONNECT operation shown in FIG. 10 ((S8) to (S11) in FIG. 6) and thereafter operates in accordance with the procedure for offering services in the push protocol class 422 shown in FIG. 9.

Specifically, the application program 103*b*/OBEX protocol 42 on the client side acquires server capabilities from the application program 103*b*/OBEX protocol 42 on the server side in accordance with "Get capabilities" procedure by a GET operation shown in FIG. 11 ((S12) in FIG. 6). The "Get capabilities" procedure is performed arbitrarily.

In addition, in order to transmit data for identifying a file to be transmitted to the server, the application program 103*b*/OBEX protocol 42 on the client side performs a "Set path" procedure by the SETPATH operation shown in FIG. 12 ((S13) in FIG. 6). In the SETPATH operation, "Folder name" is notified to the server as data for identifying a file (object), for example, header data. The application program 103*b*/OBEX protocol 42 on the server side always responds to the SETPATH operation with the SUCCESS operation. The SETPATH operation does not necessarily force the server to create a folder.

After the SETPATH operation, the application program 103*b*/OBEX protocol 42 on the client side transmits a file in a common group (folder) corresponding to "Folder name" notified to the application program 103*b*/OBEX protocol 42 on the server side in accordance with the "Push object" procedure by the PUT operation shown in FIG. 13 ((S14) in FIG. 6). When a plurality of files exist in the common group, the Put operation (or file transmission) is performed repeatedly on each file ((S15) in FIG. 6). Furthermore, the SETPATH operation and PUT operation (file transmission) are performed repeatedly as needed, for example, when files in a plurality of groups are transmitted.

Moreover, the application program 103*b*/OBEX protocol 42 on the client side performs a "Get default object" procedure by the GET operation shown in FIG. 14 as needed. In the push protocol class 422, data (object) to be acquired is specified by the type header of the GET operation. As a result, the server determines a suitable object according to the specified type header and transmits the determined object to the client. Then, following the "Get default object" procedure, the close proximity wireless transfer system of the embodiment realizes a capture image transmission process.

More specifically, to obtain a capture image on the display screen on the server side, the client adds a parameter for specifying the attribute of the requested data as image (e.g., "image/jpeg" shown in FIG. 9) to "Get default object" procedure, that is, "Get default object" command, and transmits the resulting command. When receiving the parameter-added "Get default object" command, the server interprets the command as meaning that the transmission of a capture image has been requested and generates a capture image of the display screen and sends back the generated image. That is, by adding a specific parameter without providing a special command for requesting a capture image, an existing command is also used as a command for requesting a capture image.

When the transmission of files from the client side to the server side has been completed, the application program 103b/OBEX protocol 42 on each of the client side and the server side performs a "Disconnect" procedure by the DISCONNECT operation shown in FIG. 15 via the PCL OBEX adapter 32 ((S16) to (S20) in FIG. 6).

In addition, the PCL controller 31 on the client side requests the PCL OBEX adapter 32 to terminate communication in the OBEX protocol 42 ((S21) in FIG. 6). Similarly, the PCL controller 31 on the server side requests the PCL OBEX adapter 32 to terminate communication in the OBEX protocol 42 ((S22) in FIG. 6). Then, the PCL controller 31 on each of the client side and the server side stops the communication adapter corresponding to the protocol of the application program 103b (in this case, the PCL OBEX adapter 32), thereby disconnecting close proximity wireless transfer ((S23) in FIG. 6).

Figure 16:
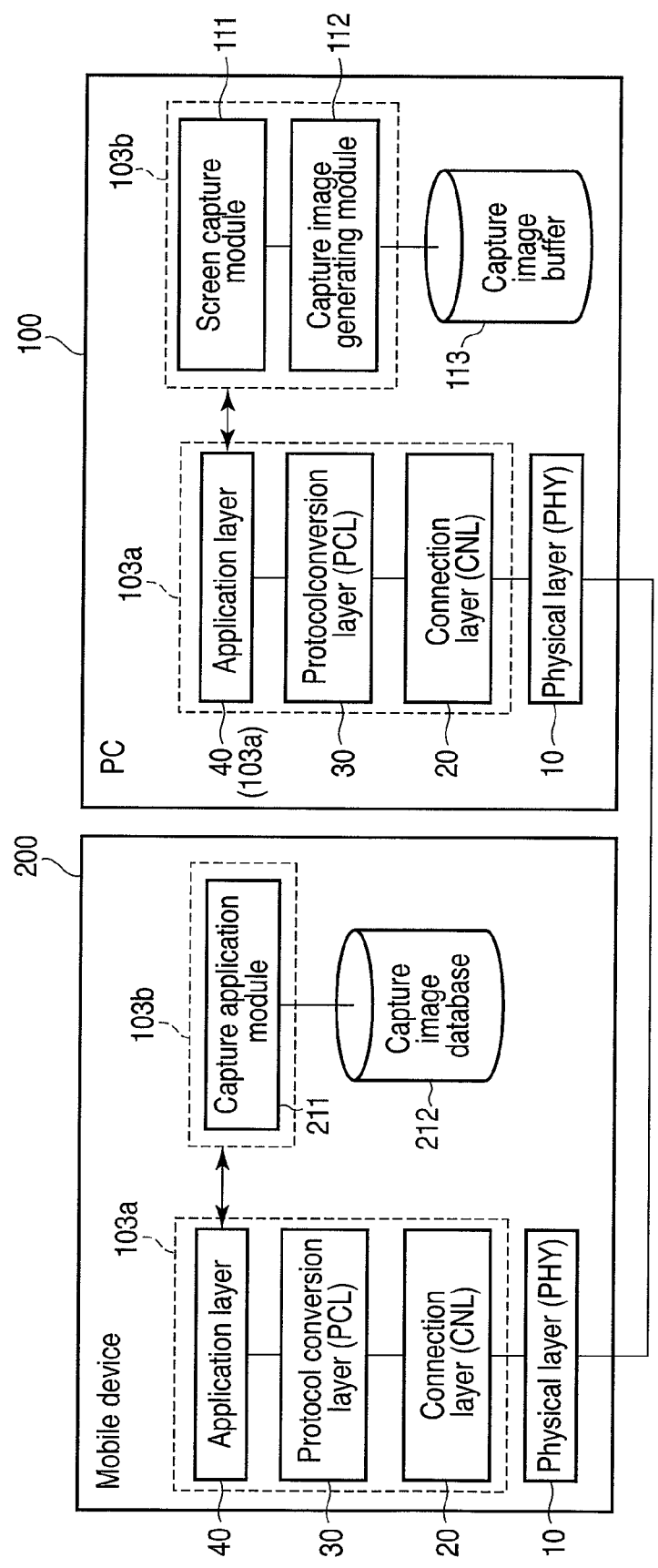
FIG. 16 is an exemplary view showing functional blocks related to transmission of capture images in the close proximity wireless transfer system of the embodiment.

FIG. 16 shows functional blocks related to the transmission of capture images in the close proximity wireless transfer system of the embodiment in accordance with a software architecture for controlling close proximity wireless transfer explained with reference to FIG. 5 and a file transmission sequence performed between the client and server using (the push protocol class of) the OBEX protocol explained with reference to FIG. 6.

As shown in FIG. 16, the capture application program on the mobile phone 200 side, which is one of the various application programs 103b (activated by the user), includes a capture application module 211. In the mobile phone 200, a capture image database 212 for storing capture images acquired by the capture application program is assembled. The capture application program on the PC 100 side which exists as one of the various application programs 103b (activated automatically as a result of the reception of a capture request) includes a screen capture module 111 and a capture image generating module 112. In the PC 100, a capture image buffer 113 for temporarily storing capture images generated by the cooperation between the screen capture module 111 and capture image generating module 112 is assembled. In the PC 100, the protocol conversion layer 30 (PCL controller 31) is set so that the capture application program may be activated automatically after the specific-parameter-added "Get default object" command is received (which is interpreted as meaning that a capture request has been accepted).

The capture application module 211 is a module for acquiring image data (capture images) on the display screen of the PC 100 by transmitting the "Get default object" command determined in the push protocol class 422 of the OBEX protocol 42. The capture application module 211 adds a parameter for specifying the attribute of requested data as images to the "Get default object" command. The capture application module 211 stores the acquired capture images into the capture image database 212.

The screen capture module 111 is a module for capturing the display screen when having interpreted that a capture request has been received by receiving a parameter-added "Get default object" command determined in the push protocol class 422 of the OBEX protocol 42. This parameter is for specifying the attribute of requested data as images. The capture image generating module 112 is a module for converting image data on the display screen captured by the screen capture module 111 on a packet basis (in close proximity wireless transfer). The screen capture module 111 further provides a user interface for enabling the user to set a capturing range ("a1" in FIG. 1 or "b3" in FIG. 2) on the display screen.

The image data generated in packets by the capture image generating module 112 is stored temporarily in the capture image buffer 113. The stored image data is read sequentially as response data to the capture request by the (attribute-specifying-parameter-added) "Get default object" command determined in the push protocol class 422 of the OBEX protocol 42. The read data is transferred to the mobile phone 200.

As described above, by using the "Get default object" procedure in the push protocol class 422 defined in the OBEX protocol 42 that determines the procedure for offering various services with adding a specific parameter, the capture application module 211 of the mobile phone 200 (activated by the user) transmits a capture request to the PC 100. Then, in the PC 100, after the capture request is accepted in accordance with the specific-parameter-added "Get default object" procedure, the screen capture module 111 and capture image generating module 112 are activated, thereby generating image data (capture images) on the display screen. The generated capture images are sent back to the mobile phone 200 as response data to the capture request accepted in accordance with the specific-parameter-added "Get default object".

Accordingly, the user can load image data of the screen now being displayed on the PC 100 into the mobile phone 200 by simple operations on the mobile phone 200 (that is, simply by activating the capture application program and touching it to the PC 100).

Figure 17:
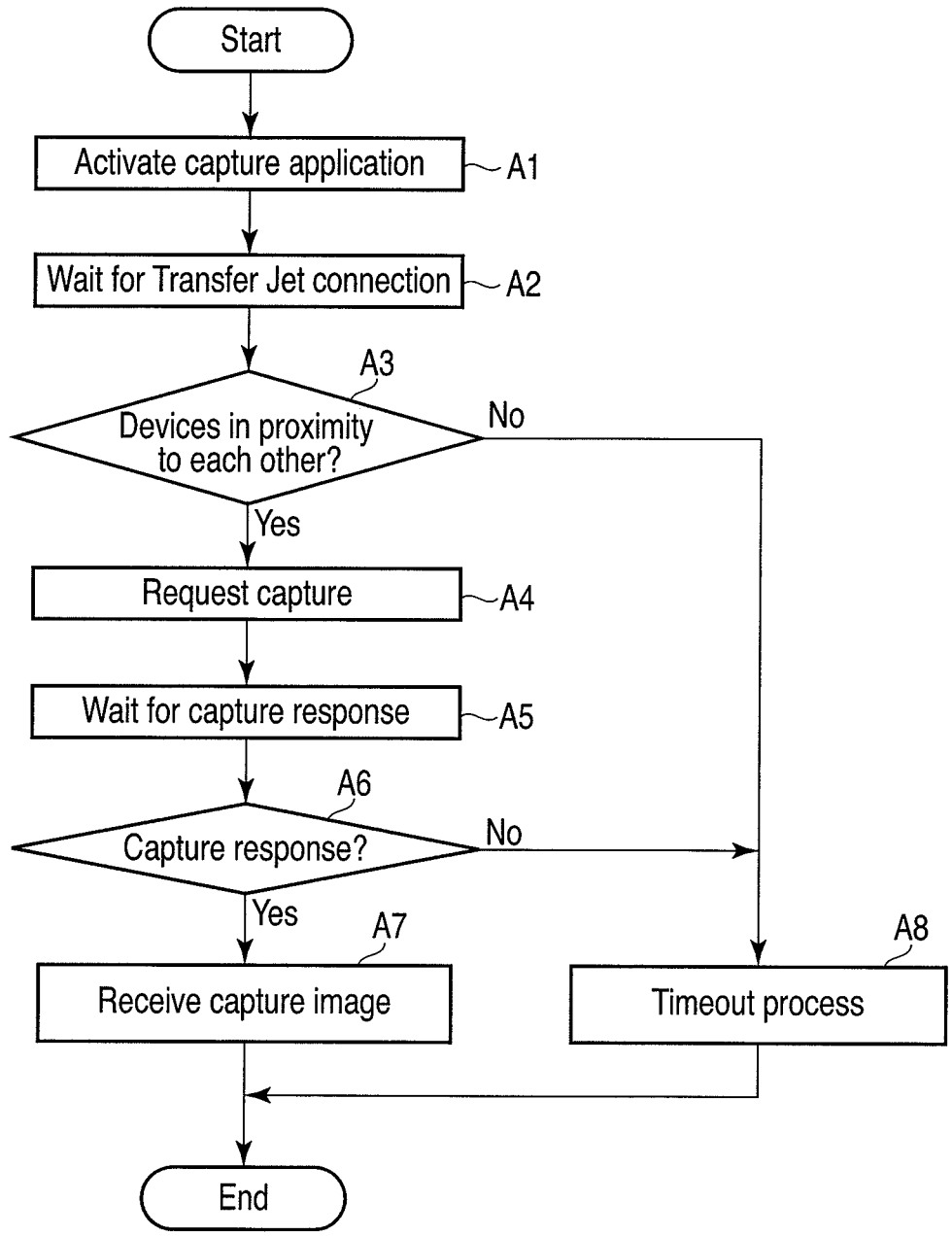
FIG. 17 is an exemplary flowchart showing an operation procedure of the mobile phone related to a process of transmitting capture images in the close proximity wireless transfer system of the embodiment.

FIG. 17 is an exemplary flowchart showing the operation procedure of the mobile phone 200 related to the process of transmitting capture images in the close proximity wireless transfer system of the embodiment.

When the capture application program has been activated (block A1), the phone 200 waits for connection by close proximity wireless transfer (block A2). If the mobile phone 200 is in the proximity of the PC 100 (YES in block A3), the mobile phone 200 transmits the "Get default object" command which is determined in the push protocol class defined in the OBEX protocol and which is added a parameter for specifying the attribute of requested data as images as a capture request to the PC 100 (block A4).

Thereafter, the phone 200 waits for a response to the "Get default object" command (block A5). If a capture image has been sent back (YES in block A6), the phone 200 receives the capture image (block A7) and terminates the communication. If the mobile phone 200 is not in the proximity of the PC 100 (NO in block A3) or no capture image has been sent back (NO in block A6), the phone 200 carries out a timeout process (block A8) and terminates the communication.

Figure 18:
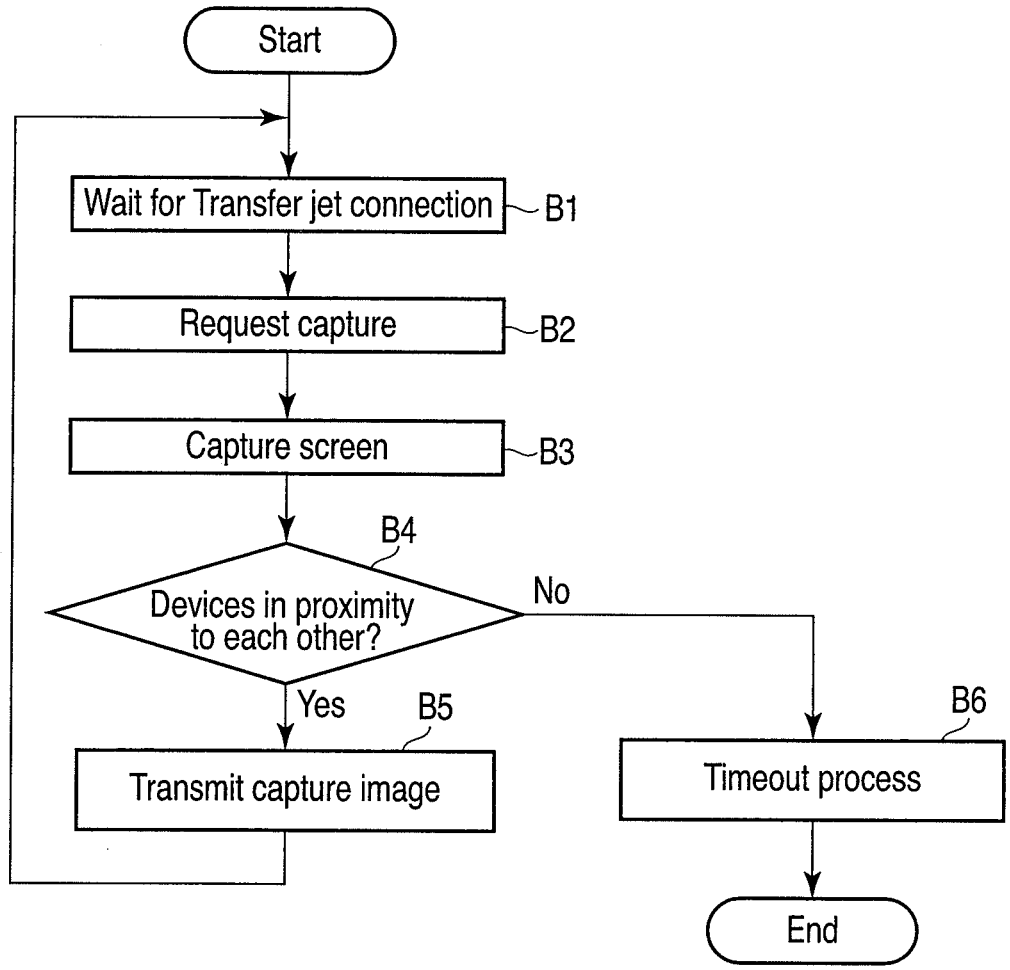
FIG. 18 is an exemplary flowchart showing an operation procedure of the PC related to a process of transmitting capture images in the close proximity wireless transfer system of the embodiment.

FIG. 18 is an exemplary flowchart showing the operation procedure of the PC 100 related to the process of transmitting capture images in the close proximity wireless transfer system of the embodiment.

The PC 100 is waiting for connection by close proximity wireless transfer (block B1). In this state, when having received the "Get default object" command which is determined in the push protocol class defined in the OBEX protocol and which is added a parameter for specifying the attribute of requested data as images (in proximity to the mobile phone 200), the PC 100 interprets the reception of the command as meaning that a capture request has been received (block B2) and generates a capture image of the display screen (block B3).

After the generation of the capture image, if the PC 100 is in the proximity of the mobile phone 200 (YES in block B4), the PC 100 sends back the capture image to the mobile phone 200 (block B5) and returns to wait for connection by close proximity wireless transfer of block B1. If the PC 100 is not in the proximity of the mobile phone 200 (NO in block B4), the PC 100 carries out a timeout process (block B6) and terminates the communication.

As described above, the close proximity wireless transfer system of the embodiment enables a capture image to be transmitted between devices by close proximity wireless transfer with simple operations.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The various modules of the systems described herein can be implemented as software applications, hardware and/or software modules, or components on one or more computers, such as servers. While the various modules are illustrated separately, they may share some or all of the same underlying logic or code. The accompanying claims and their equivalents are intended to cover such forms or modifications as would fall within the scope and spirit of the inventions.

The invention claimed is:

1. A method of transmitting a capture image for an information processing apparatus comprising a communication module configured to execute close proximity wireless transfer, the method comprising:
   establishing connection between the communication module and an external device; and
   generating image data for a screen displayed on a display device and transmitting the generated image data to the external device when a "Get default object" command to which a parameter is added is received from the external device in a state where connection between the communication module and the external device is established, the "Get default object" command being defined in a push protocol class of an object exchange (OBEX) protocol, the added parameter indicating an attribute of requested data as images.

2. The method of claim 1, wherein the transmitting the generated image data comprises generating image data for an entire display screen.

3. The method of claim 1, wherein the transmitting the generated image data comprises generating image data for an active window area on the display screen.

4. The method of claim 1, further comprising setting either the entire display screen or an active window area on the display screen as a range for which image data is to be generated.

* * * * *